United States Patent

Kroy et al.

[15] 3,657,708

[45] Apr. 18, 1972

[54] ELECTRONIC STORAGE APPARATUS

[72] Inventors: Walter Kroy; Walter E. Mehnert, both of Munich, Germany

[73] Assignee: Messerschmitt-Bolkow-Blohm GmbH, Postfach, Germany

[22] Filed: Dec. 11, 1969

[21] Appl. No.: 884,213

[30] Foreign Application Priority Data

Dec. 13, 1968 Germany....................P 18 14 529.4
Dec. 13, 1968 Germany....................P 18 14 527.2
Dec. 13, 1968 Germany....................P 18 14 528.3
June 4, 1969 Germany....................P 19 28 549.5

[52] U.S. Cl. ..............................340/173 CR, 340/173 R
[51] Int. Cl...................................................G11c 11/26
[58] Field of Search..................340/173 CR, 173 R, 173 DR

[56] References Cited

UNITED STATES PATENTS 3,528,064 9/1970 Everhart...............................340/173
2,901,662 8/1959 Nozick...................................315/12
3,003,110 10/1961 Toulemonde..........................340/173
3,362,017 1/1968 Braum..................................340/173
3,506,971 4/1970 Sakurai................................340/173

*Primary Examiner*—Terrell W. Fears
*Attorney*—Woodhams, Blanchard and Flynn

[57] ABSTRACT

Electronic storage unit for storing large quantities of data in a small space. A first suitably coated metal plate cooperates with a first electron beam for recording data, said first beam being controlled through a suitable address unit, switching unit and control device, together with an amplifier for compensating for losses in the strength of recorded data. A second electron beam system is provided for reading out data, said second beam system being provided with a second suitably coated metal plate and is subjected to the control of said address unit. The second electron beam system acts through a further amplifier and switching unit to the device, as a computer, being controlled.

12 Claims, 8 Drawing Figures

Patented April 18, 1972 3,657,708

5 Sheets-Sheet 1

INVENTORS
WALTER KROY
WALTER E. MEHNERT
BY
Woodhams, Blanchard & Flynn
ATTORNEYS INVENTORS
WALTER KROY
WALTER E. MEHNERT
BY Woodhams, Blanchard & Flynn
ATTORNEYS INVENTORS
WALTER KROY
WALTER E. MEHNERT
BY
Woodhams, Blanchard & Flynn
ATTORNEYS Patented April 18, 1972 3,657,708

5 Sheets-Sheet 4

INVENTORS
WALTER KROY
WALTER E. MEHNERT
BY Woodhams, Blanchard & Flynn
ATTORNEYS Patented April 18, 1972 3,657,708

5 Sheets-Sheet 5

INVENTORS
WALTER KROY
WALTER E. MEHNERT
BY
Woodhams, Blanchard & Flynn
ATTORNEYS

ELECTRONIC STORAGE APPARATUS

The invention relates to an electronic storage apparatus for storing large quantities of data in a very small space, for example, to a working and programming storage unit for computers.

Many different types of electronic storage apparatus are already known. Apart from the general drum stores, core storage devices and tape storage devices, use is made of, for example, superconductive layer (laminated) stores with recording (writing) leads, which cross each other perpendicularly, on one side of a superconductive layer and superconductive read-out lines, each of which runs along a bit (binary digit) line, these read-out lines being inductively separated from the recording lines. The special feature of these layer stores is the fact that the read-out line is made from a superconductor having a critical field strength which is so low that the field of a flux stored in the layer suffices to switch the read-out line into its normally conductive condition, a superconductive section being connected in parallel with each section of the read-out line under each cell. The manufacturing costs — in particular the costs of the wiring necessary by reason of the many read-out and recording lines — are extremely high in the case of electronic storage apparatuses with a large number of cells.

Also known is a storage apparatus in which a storage material is used on which high frequency signals can be recorded by exposing spiropyranes to high energy radiation, so that they undergo discoloration or coloration. Also, manufacturing costs are very high in this known device, above all for effecting read-out of the signals.

A further known type of storage apparatus is based on the principle of the thermoplastic deformation of a surface layer. Very often these methods are unfavorable with regard to the number of items of information per surface unit; above all, however, because the access and recording times are relatively high. Equally unsatisfactory are those storage apparatuses having luminophoric substances, the luminescence being detectable by photosensitive means, which then produce signals indicative of the data stored in the storage apparatus.

The invention has the object of providing an electronic storage apparatus which not only has a high storage capacity but which enables the access lines and access times to be appreciably reduced. This object is realized by arranging for a metal plate, having a covering, semiconductor layer, to cooperate with a first electron beam system, with a view to recording the required information, this electron beam system being controlled by an upstream-connected address unit, and a control device, equipped with an amplifier, is provided for compensating for the loss of strength (intensity) in the recorded or stored information; and a second electron beam system, also controlled by the address unit, is provided for effecting read-out of data and for restoring the data, this second electron beam system having a metal plate equipped with a covering layer of semi-conductor material and with a further amplifier, this latter-mentioned amplifier feeding the data, firstly and by way of a switching unit, into the device connected to the electronic storage apparatus and, secondly and with a view to effecting restoring of the data, into the electron beam system.

These expedients proposed according to the invention not only permit the attainment of a large storage capacity but — and this is regarded as being very important — only a single access line is required for all the storage elements and, moreover, the access times are kept extremely low. The access times are as a practical matter, restricted only by the speed at which the electron beam can be deflected.

It is also proposed that threshold amplifiers should be used for regenerating the data recorded on the storage plates, these amplifiers being capable of distinguishing between two or $k$ (for example eight) strength or intensity levels. This expedient enables detection to be carried out in a well-defined manner, and the stored values to be assigned to the $k$ strength levels.

According to one embodiment of the invention it is proposed that condenser plates should be used as storage plates and that the storage plates should be provided with a raster of for example $10^5 \times 10^5$ elements. In this way an enormously high storage capacity is realized, as a capacity of $10^{10}$ bits per plate is attained when only two different strength levels are available for a raster of the semi-conductor plates or condensor plates of $10^5 \times 10^5$ elements.

It is further proposed to provide a storage unit in which, during the operation thereof, new data can be fed into the storage elements or data which is no longer needed can be erased. According to the invention, this is realized by arranging for a switching unit to cooperate with three storage elements and with their associated three electron beam devices, this switching unit connecting together, at pre-determined intervals of time, alternate pairs of the storage elements for the purpose of restoring the level of strength of the stored data, the third storage element being connected to the external device, for example a computer.

According to a modification of the invention an address unit is arranged to cooperate with the switching unit and is so controlled by the latter that only the switching unit which is free at any given time can be addressed by the external device. This manner of operation ensures a large storage capacity, appreciably reduced access times, and enables versatile and rapid programming to be carried out.

A further object of the invention consists in providing a storage element which has a large capacity and in which the access times are appreciably reduced. This object is realized by providing a metal plate which is coated with a covering, semi-conductor layer, this electron beam system being controlled (*xy*-deflection) through the intermediary of an upstream-connected address unit and, for compensating for the losses in strength of the data recorded on the semi-conductor layer, a control device with an amplifier is provided. This expedient results in a large storage capacity and in extremely low access times, which are now only limited by the speed at which the electron beam can be swept or deflected.

It is further proposed to provide, for recording data, a metal plate with an insulating layer and with metal plates which are applied to the latter by vaporizing the metal thereon. This arrangement is of particular value in applications in which processing is to take place with the energy of an electron beam.

The invention also has the object of providing a storage unit in which information can be simultaneously recorded (stored) and read-out. According to the invention this is realized by arranging for two electron guns to cooperate with each of the storage plates; the one of the two electron beam guns of one system which, at any given time, is being used for reading-out data is coupled to the electron beam gun of the other system for which a read-out of data is taking place.

This manner of operation affords the great advantage that it completely eliminates the dead time—necessarily required while the electron beam is being re-directed in the course of its deflection from element to element of the raster—of the storage system, as during this dead time the second system provided according to the invention, is actually automatically engaged in either recording data or effecting a read-out of recorded data.

The invention is described below with reference to the appended drawings. Further advantages and proposals will be apparent from the text of the description and from the drawings which illustrate the different embodiments of the invention. In these drawings.

Figure 3:
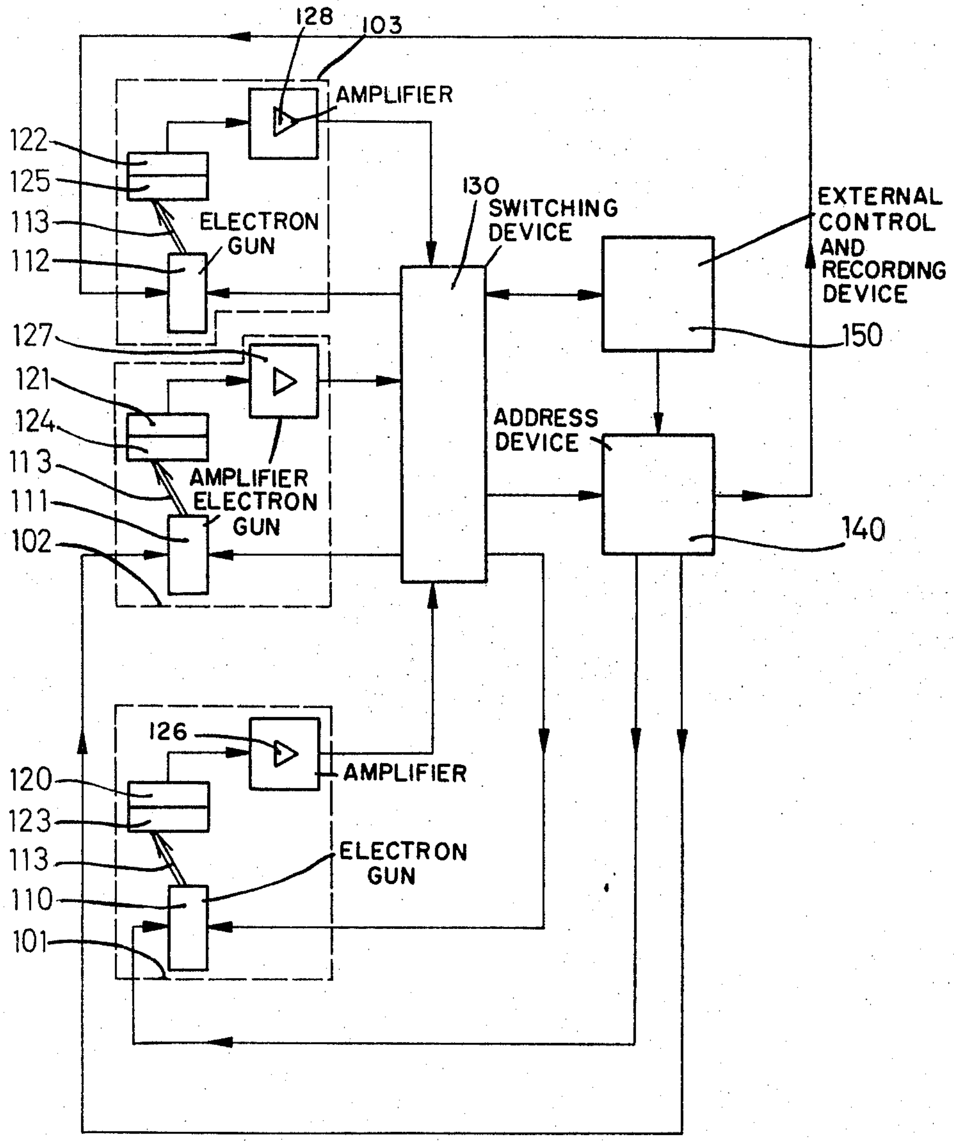
Figure 4:
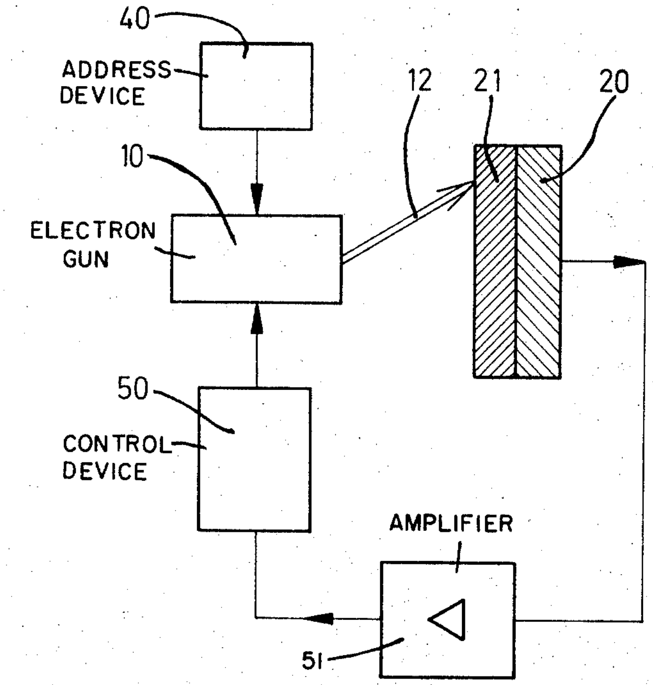
Figure 5:
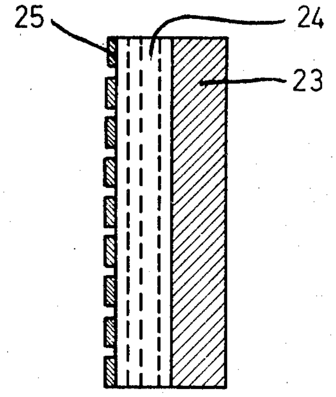
Figure 6:
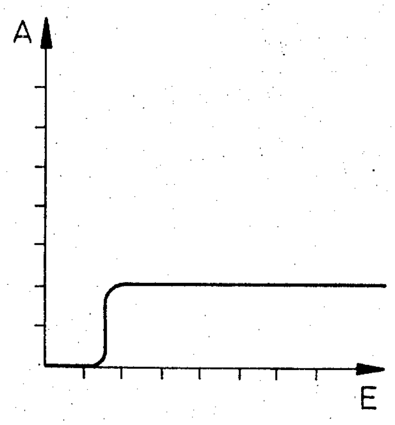
Figure 7:
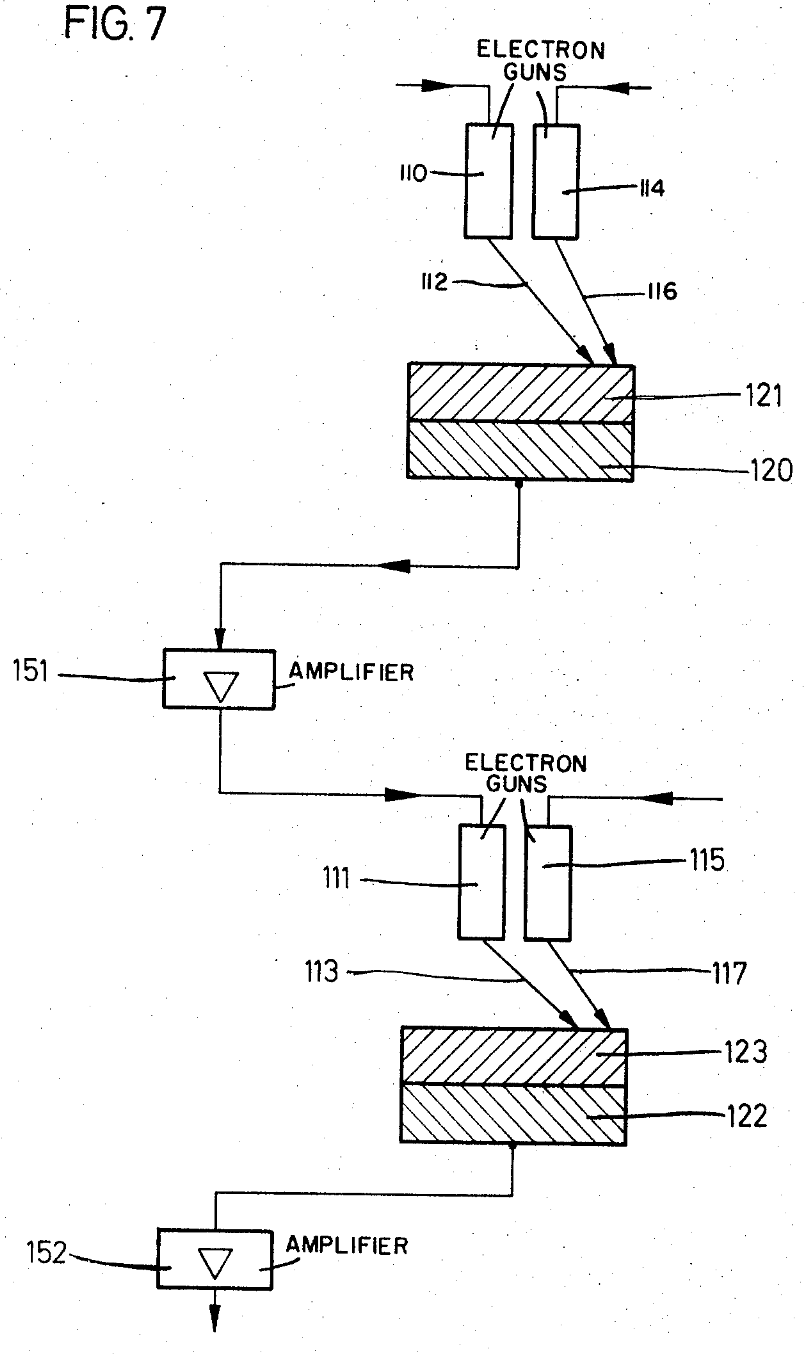
Figure 8:
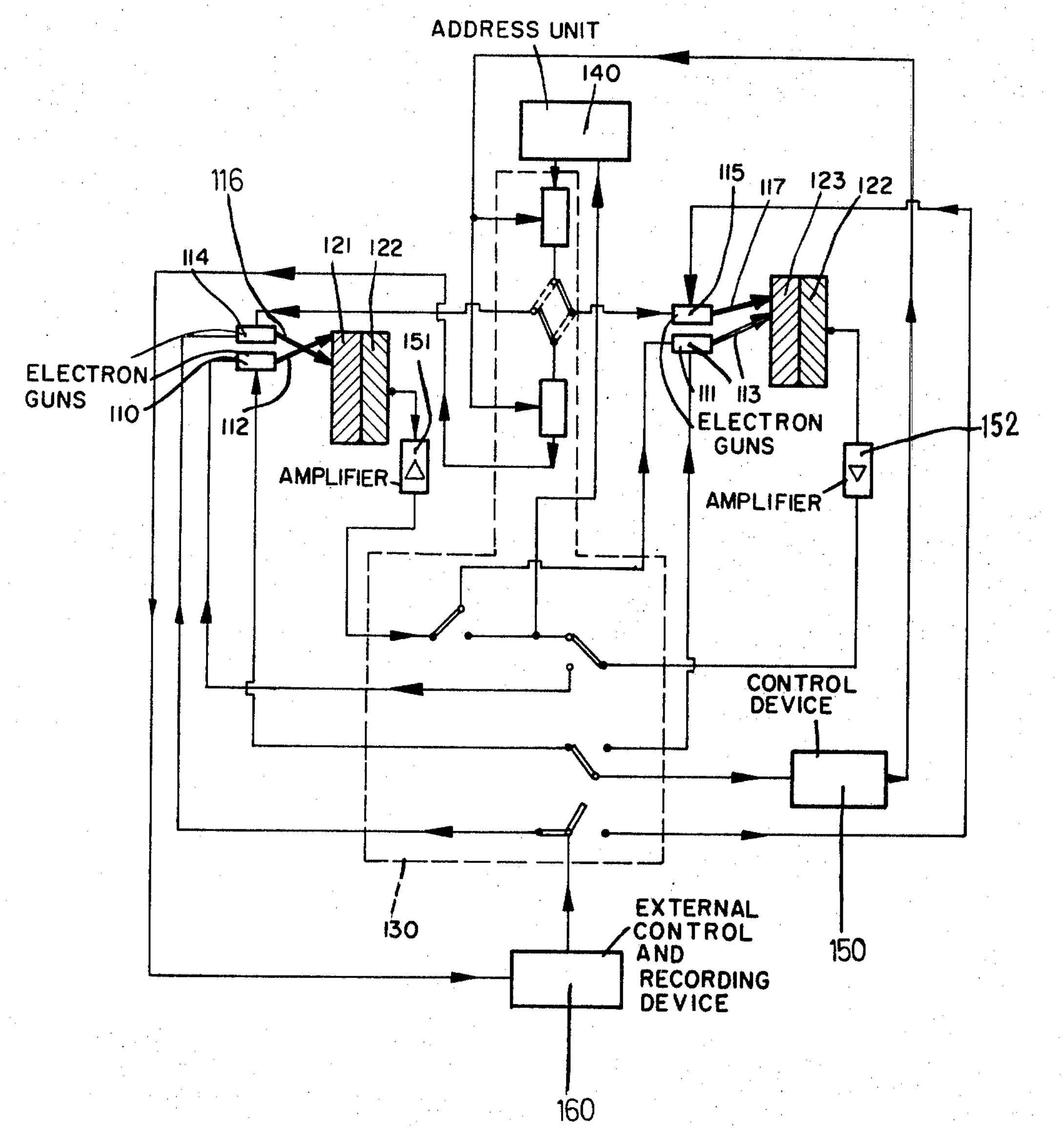

FIG. 3 is a block circuit diagram illustrating one of the embodiments described, FIG. 4 is a block circuit diagram of the switching arrangement according to the invention, FIG. 5 is a cross-sectional view of an embodiment of a storage plate according to the invention, FIG. 6 is a graph of an input/output characteristic curve, FIG. 7 is a diagrammatic sketch of an arrangement according to an embodiment of the invention, FIG. 8 is a circuit diagram of the storage unit operating according to the embodiment of the invention referred to.

Figure 1:
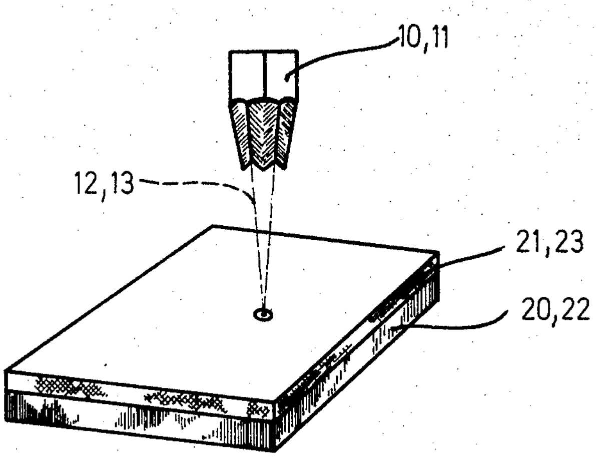
FIG. 1 is a diagrammatic view illustrating a storage plate according to the invention, with the electron beam system.

By means of an electron ray or beam 12 (FIGS. 1 and 2), for example from an electron beam gun 10, data is recorded on the metal plate 20 which is provided with a layer 21 of semi-conductor material. In this case the conductivity of the semi-conductor layer is altered by the electrons. If, however, so-called condensor plates are used, then a charge of a certain value is applied to the insulated plate of this condensor. In both instances the applied data will alter after the lapse of a certain time. In the case of the arrangement with the layer of semi-conductor material, this alteration in the recorded data takes place as a result of the charge-carriers diffusing away, whereas in the case of the so-called condensor plates it take place as a result of insulation losses. In order, in general, to prevent losses in the recorded data and, in particular, to prevent the strength (intensity) of the recorded data from weakening, it is proposed according to the invention that the storage system 21, 20 should be regularly scanned by the electron beam 12 subsequent to the recording of the data, the deflection signals required for this purpose being supplied from a control device 50. The current signal received by the metal plate 20 is fed to the threshold amplifier 51, whose output controls the strength of the scanning beam 12. In this way the strength of recorded signals which have become weakened is restored. According to the particular amplifier 51, 52 used it is possible to operate with two or more (e.g. eight) strength levels. In order to use the data a second, identical system is provided which consists of the electron gun 11 (used by way of example), the storage element 22, 23 and the threshold amplifier 52; this said second system is connected to the control device 50 by the switching unit 30. This said second system also contains the same data as the first storage systems 10, 20, 21, 51, 30, 50.

The amplifier 51 or 52, which receives the signal emitted by the storage device 20, 21 or 22, 23 must — in those cases in which, for example, *k* different intensity values are used during recording — contain *k* discriminator thresholds. The current strength appearing at the plate output 24 or 25 at any given time is sensed, by means of the discriminators, with a view to ascertaining to which of the *k* strength values the stored data belongs. The amplifier concerned, 51 or 52, brings the signal to the original level or value of the upper edge corresponding to the strength level. In this way at the same time irregularities in the speed of discharge of the storage plate, for example as a result of a non-uniform surface or non-uniform layer thickness, can be compensated for.

While the value of recorded signal strength of one of these systems is being restored or regenerated, the other system is connected to externally arranged devices 60 (e.g. computers, tape recording devices, etc). Addresses,—which for example may be binary coded produce in a summation stage totals which correspond to their data content — are introduced through the intermediary of an address device 40 which is controlled by the devices 60 and which effects adjustment of the deflection voltages of the electron beams 12, 13 to specific values given by the totals in the summation stage.

While data is being read out, the signal arriving from the metal plate 20, 24 or 22, 25 is de-coupled with respect to the amplifier 51 or 52 respectively, although it is simultaneously fed back into the electron beam system 10, 11 so that the data read-out will not be lost. When the strength level of one system has been completely restored or regenerated, restoration commences on the signal level of the system from which the data has been taken. During this time the external devices 60 are automatically switched over, by an electronic switching unit 30, 31 to the storage system, the strength level of whose recorded data has just been restored.

The invention represents a distinct technical advance in relation to the prior art, above all for data-, information-, and image-storing units; this is because — owing to the fact that *k* (e.g. 1 to 8) different strength levels can be stored on each storage point — the available storage capacity will be extremely high. If consideration is given, for example, to an accessible raster size of 3,000 × 3,000 image points, then the number of bits will be of the order of magnitude of about 27,000,000, if there are eight distinguishable charge strength levels, so that the size of the storage plate will be very small in comparison with that of the plates hitherto used. In addition, there is the significant advantage of an appreciable reduction of the access times which have hitherto been experienced, the access times being kept extremely small when the principles of the present invention are employed. It should also be mentioned that it is not only possible to effect a point-wise read-out but, as in the case of drum stores, the read-out can take place line by line. It is true that in this case the access times are somewhat greater, but they are still far less than those which have hitherto been found to be necessary.

The embodiment, illustrated in FIG. 3, of a storage unit consists 125 of the electron guns 110, 111, 112, the electron beam 113 of each of which is used for recording or for effecting read-out of data and also for restoring the strength of weakened data signals, as will be described in detail below. The storage unit for the data is constituted by a semi-conductor layer 123, 124, 15 which is provided with a raster and which is laid on a metal plate 120, 121, 122. Electron gun 110, storage unit 120, 123 and threshold amplifier 126 are combined to form an assembly 101; similarly, units 111, 121, 124 and 127 combine to form assembly 102, and units 112, 122, 125 and 128 combine to form an assembly 103.

While recording is taking place the conductivity of the semi-conductor layer 123, 124, 125 is altered by the electron beam 113 and, while a read-out of data is taking place, the sensing electron beam causes a current signal to be fed, from the metal plate 120, 121, 122 concerned and by way of an associated threshold amplifier 126, 127, 128, to a switching unit 130. This switching unit 130 is arranged to cooperate with an address unit 140, and devices 150 (e.g. computers), which lie to the outside of the switching unit 130 are disposed downstream. At any given time two assemblies, e.g. 101 and 102, are so connected to each other that data, read out from the assembly 102 and amplified by the threshold amplifier 127, are recorded in the assembly 101, the data passing to assembly 101 through the intermediary of switching unit 130. At the same time the assembly 103, which has stored the same data as the assemblies 101, 102 is connected to external devices (e.g. a computer 150), so that data can be read out to these external devices or so that new data can be recorded from the external devices. By reason of the loss of strength, which any data recorded on the semi-conductor layer 123, or 124, 125 undergoes, after the lapse of a certain time, owing to the charge carriers diffusing off, it is necessary to restore the strength of the data by transferring data from, for example, assembly 102 to assembly 101. When restoration of the strength of recorded data has, in this way, been completed, then the assembly 103, previously connected to the external device 150, is switched by the switching unit 130, to the assembly 102. In this way the data of assembly 103 is rerecorded on assembly 102 for the purpose of compensating for losses in the strength of the data recorded on assembly 102, while at the same time assembly 101 is connected to the external device 150. Thus, two of the assemblies are alternately connected together, in continuous sequence, for the purpose of compensating for losses in the strength of the recorded data, while the third assembly is always used for recording data or for effecting a read-out of the latter.

The address unit 140 controls the electron beam system 110 and 111 or 112 of that assembly 101 and 102 or 103 with which the external devices 150 can exchange data, while the switching unit 130 controls the address unit 140 in such a manner that only the assembly which is free at any given time can be addressed by the external device (e.g. a computer) 150.

An essential feature of the arrangement proposed according to the invention resides in the fact that, during operation of the storage unit, new data can be fed into the storage elements 123, 124, 125 or, alternatively, data which is no longer required can be erased at any time. Although it is true that access to the newly recorded data is only possible after two storage cycles, nevertheless the access times of the arrangement according to the invention are still extremely short and are only limited by the deflection speed of the electron stream system.

The embodiment illustrated in FIGS. 4, 5 and 6, of a storage element for the storage system according to the invention functions as follows:

By means of an electron beam, e.g. emitted from an electron beam gun 10, an item of data is recorded on the semi-conductor layer 21, provided with a raster, of a metal plate 20. In this way the conductivity of the semi-conductor layer is altered by the electrons. After a certain time the strength of the recorded data will alter, this alteration taking place as a result of the fact that charge carriers diffuse away. In order to compensate for this loss of charge strength of the recorded data, per unit of time, the current signal received from the metal plate 20, is fed through a threshold amplifier 51 to a control device 50; in its turn this control device 50 controls the strength of the electron beam, so that the lost charge strength is restored or regenerated by the re-recording of data onto the semi-conductor layer 21. The amplifier 51 has an input/output characteristic curve as represented in FIG. 6, the value of numerical units on the graph axes depending on the particular system or equipment used. In this way it is ensured that the control device 50 will only restore the strength of the recorded data (weakened by diffusing away) when a specific charge value is already present on the particular point under consideration of the semi-conductor surface. This minimum value, which will depend on the particular system or equipment used, is adjustable with reference to the position of the threshold on the characteristic curve (see FIG. 6).

Figure 2:
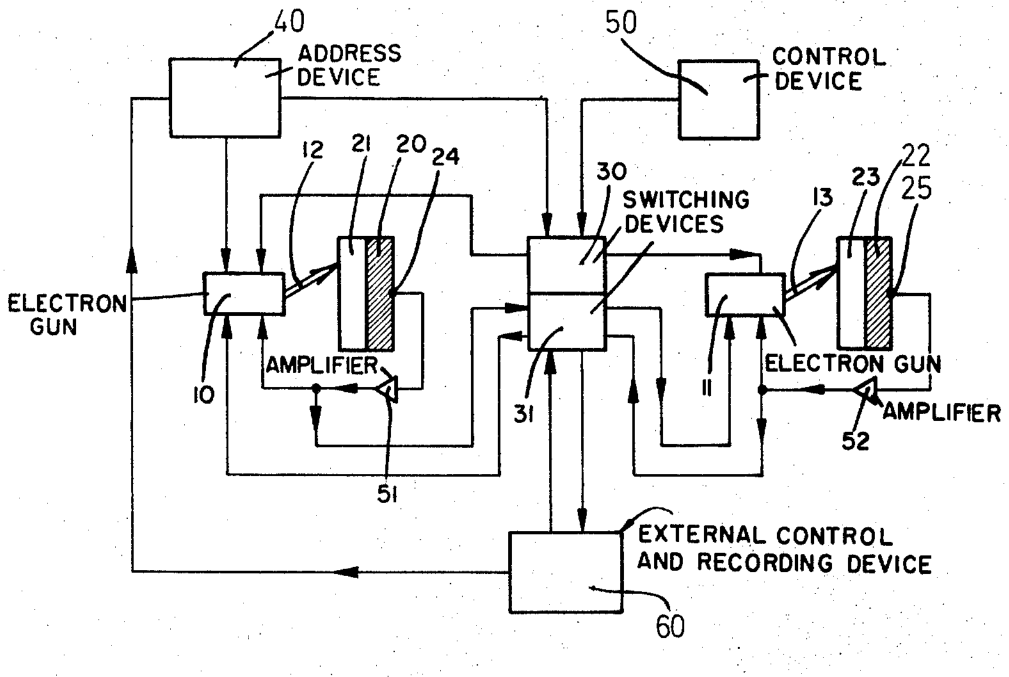
FIG. 2 is a circuit diagram of the arrangement according to the invention.

This principle of the continuous restoration of the strength of recorded data on the storage element proposed according to the invention remains unaltered also in those cases in which so-called condenser storage plates according to FIG. 2 are used. In these cases it is not the strength of the electron beam which is altered but the energy thereof, as a result of which the lost strength of the recorded data is restored or regenerated.

The further embodiment of the invention illustrated in FIGS. 7 and 8 functions as follows:

Two electron beam guns 110, 114 and 111, 115 are arranged to cooperate with the storage plates 120, 121 and 122, 123 respectively. If data is being read off from the storage plate 120, 121 by means of the electron beam proceeding from the electron beam gun 110, then this data will be (subject to simultaneous amplification) immediately recorded, by means of the electron beam 113 from the electron beam gun 11, on this storage plate 122, 123, so that it will thus be ensured that the recorded data will not be expunged. Thus, while read-out is being effected by the electron gun 110, the electron gun 111 will be engaged in recording data and the electron gun 114 will already be in the process of being positioned (directed) for the purpose of recording new data. If data is now recorded, by means of the electron beam gun 114, on the storage plate 120, 121, the electron gun 110 will be in the process of being positioned or directed for recording new data. It is thus possible, by means of the arrangement according to the invention, to simultaneously record new data, to strengthen data which has already been recorded, and to effect a read-out of recorded data, because the two systems 110, 111 and 114, 115 are independent of one another. The electronic switching unit 130 controls the system which is required for use at any given moment, while the control device 150 affects the control of the electron beams 112, 113, 116, 117 of each separate electron gun. The external devices 160 are thus automatically switched by the electronic switching unit 130, to the storage system which is required at any given time, the external devices 160 controlling an address device 140, which effects adjustment, to specific values, of the deflection voltages for the electron beams.

The embodiments of the invention in which an exclusive property or privilege is claimed are defined as follows:

1. An electronic storage apparatus for storing large quantities of data in a small space, comprising:

a storage member having a characteristic of losing a charge applied thereto over a period of time;

first electron beam means for generating a first electron beam including means for controlling the $x$-$y$ deflection of said first electron beam to strike said storage member and place a predetermined applied charge on said storage member;

control means for effecting a periodic testing of said storage member to determine whether said predetermined charge has diminished in value, said testing producing a signal indicative of the magnitude of said charge; and detecting means for detecting said signal and for effecting a regenerating of the charge on said storage member to said predetermined charge.

2. An electronic storage apparatus according to claim 1, wherein said storage member comprises a metal plate coated with a layer of semi-conductor material, the conductivity of said thin layer of semi-conductor material being altered by said first electron beam means.

3. An electronic storage apparatus according to claim 2, wherein said deflecting means comprises address means for controlling the deflection of said first electron beam and the location at which said first electron beam strikes said storage member.

4. An electronic storage apparatus according to claim 3, wherein said control means comprises second electron beam means for generating a scanning electron beam and includes means for controlling the deflection of said scanning electron beam, said scanning electron beam being deflected onto said storage member to effect the production of said signal; and wherein said detecting means comprises threshold amplification means adapted to restore said charge on said storage member to said predetermined value in response to said signal below said predetermined value.

5. An electronic storage apparatus according to claim 4, including third electron beam means for generating a second electron beam, said deflecting means further controlling the $x$-$y$ deflection of said second electron beam;

further including a second storage member comprising a second metal plate coated with a layer of semi-conductor material located in the path of deflection of said second electron beam and adapted to produce a second signal when said second electron beam strikes said second storage member.

6. An electronic storage apparatus according to claim 5, including switching means for controlling which ones of the first and second electron beam means are to be activated by one of said addressing means and said control means.

7. An electronic storage apparatus according to claim 1, wherein said detecting means comprise threshold amplification means adapted to restore said charge on said storage member to said predetermined value in response to said signal below said predetermined value; and wherein said threshold amplification means have a plurality of discriminator threshold levels, each level being controlled by said control means.

8. An electronic storage apparatus for storing large quantities of data in a small space, comprising:

first and second storage members each having a characteristic of losing a portion of a predetermined charge applied thereto over a period of time;

first and second electron beam means for generating first and second electron beams;

address means for controlling the $x$-$y$ deflection of said electron beams to strike a respective one of said first and second storage members and place a predetermined applied charge on said storage member;

control means for effecting a periodic testing of said first and second storage members to determine whether said predetermined charge has diminished in value, said testing producing a signal at an output of the respective one of said first and second storage members indicative of the magnitude of said charge;

first and second detecting means for detecting the signal from the respective one of said first and second storage members and for effecting a regenerating of the charge on said respective one of said first and second storage members to said predetermined charge; and switching means for (1) connecting said control means to one of said first and second electron beam means at timed intervals and in alternate sequence to effect said periodic and separate testing of one of said first and second storage members and for (2) connecting said address means to the other of said first and second electron beam means during said timed intervals and in said alternate sequence to periodically apply said predetermined charge on said other of said first and second storage members.

9. An electronic storage apparatus according to claim 8, including external control and recording means for controlling the functioning of said address means and a corresponding control of said switching means to selectively apply predetermined charge values on selected ones of first and second storage members and, in the alternative, record predetermined charge values in response to said controlled functioning of said address means.

10. An electronic storage apparatus according to claim 8, wherein said first electron beam means includes a first and second electron guns, and wherein said second electron beam means includes third and fourth electron guns.

11. An electronic storage apparatus according to claim 10, wherein said output of one of said storage members is connected through a respective one of said detecting means to said third electron gun.

12. An electronic storage apparatus for storing large quantities of data in a small space, comprising:

a plurality of storage assemblies each comprising a storage member having an output terminal and a characteristic of losing a portion of a predetermined charge applied thereto over a period of time, electron beam generating means for producing an electron beam adapted to strike said storage member and detecting means for detecting a signal from said output terminal in response to a striking by said electron beam and for effecting an amplification of said signal to a predetermined magnitude;

address means for controlling the $x$-$y$ deflection of said electron beam in each of said assemblies;

switching means for (1) connecting the output of one storage member in one assembly to the electron beam generating means in another assembly to record a charge on the storage member in said other assembly generated at said output from said one assembly in response to said striking by said electron beam and for (2) connecting still another output from still another assembly to an external control and recording device, said external control and recording device including means for controlling the functioning of said address means to selectively cause an electron beam to strike the storage member in said still another assembly to apply a new predetermined charge to said storage member or read out the predetermined charge generated at the output by said striking of the storage member by said electron beam to said external control and recording device.

* * * * *